United States Patent [19]
Stickles et al.

[11] Patent Number: 5,239,818
[45] Date of Patent: Aug. 31, 1993

[54] DILUTION POLE COMBUSTOR AND METHOD

[75] Inventors: Richard W. Stickles, Loveland; Willard J. Dodds, West Chester; Paul E. Sabla, Cincinnati; George E. Cook, Cincinnati; Craig L. Loconti, Cincinnati; Gary MacHolloway, Cincinnati, all of Ohio

[73] Assignee: General Electric Company, Cincinnati, Ohio

[21] Appl. No.: 860,635

[22] Filed: Mar. 30, 1992

[51] Int. Cl.[5] .......................... F02C 3/00; F23R 3/16
[52] U.S. Cl. ...................................... 60/39.36; 60/737
[58] Field of Search ...................... 60/39.36, 732, 747, 60/759, 738

[56] References Cited

U.S. PATENT DOCUMENTS

| | | | |
|---|---|---|---|
| 3,020,718 | 2/1962 | Deacon et al. | 60/39.74 |
| 3,304,713 | 2/1967 | Szydlowski | 60/36.36 |
| 3,316,714 | 5/1967 | Smith et al. | 60/39.36 |
| 3,353,351 | 11/1967 | Bill et al. | 60/743 |
| 3,460,345 | 8/1969 | Greenwood | 60/39.65 |
| 4,222,232 | 9/1980 | Robinson | 60/737 |
| 4,292,801 | 10/1981 | Wilkes et al. | 60/39.06 |
| 4,445,339 | 5/1984 | Davis, Jr. et al. | 60/749 |
| 4,698,963 | 10/1987 | Taylor | 60/39.06 |

OTHER PUBLICATIONS

A. H. Lefebvre, "Gas Turbine Combustion," 1983, pp: cover and 463–509.
M. B. Cutrone et al, "Evaluation of Advanced Combustors for Dry NO$_x$ Suppression with Nitrogen Bearing Fuels in Utility and Industrial Gas Turbines," ASME Paper No. 81-GT-125, Mar. 1981, pp. 1–10.
A. S. Novick et al, "Multifuel Evaluation of Rich-/Quench/Lean Combustor," Joint Power Conference 17–21 Oct. 1982, DOE/NASA/13111-10, pp. cover, 1–8.

Primary Examiner—Richard A. Bertsch
Assistant Examiner—Timothy S. Thorpe
Attorney, Agent, or Firm—Jerome C. Squillaro; James P. Davidson

[57] ABSTRACT

An annular combustor includes a plurality of circumferentially spaced, radially extending dilution poles disposed in an intermediate zone thereof between a forward combustion zone and an aft combustion zone. Adjacent ones of the dilution poles define therebetween a throat for receiving the combustion gases from the forward zone. The dilution poles include circumferentially facing dilution holes for injecting dilution air into the throats for mixing with the combustion gases being channeled therethrough. The dilution poles are effective for blocking the combustion gases at a plurality of circumferentially spaced apart locations and accelerating the combustion gases through the throats for reducing residence time in the throat. The dilution air is injected through the dilution holes for improved penetration into the combustion gases in the throats for mixing therewith to form lean combustion gases which undergo final combustion in the aft zone for reducing NO$_x$ emissions.

10 Claims, 4 Drawing Sheets

DILUTION POLE COMBUSTOR AND METHOD

The present invention relates generally to gas turbine engines, and, more specifically, to a combustor and method of operation for reducing $NO_x$ emissions.

BACKGROUND OF THE INVENTION

Commercial, or civil, aircraft and industrial land based gas turbines are conventionally designed for reducing exhaust emissions from combustion of hydrocarbon fuel such as, for example, Jet-A fuel. The exhaust emissions may include hydrocarbon particulate matter, in the form of smoke, for example, gaseous hydrocarbons, carbon monoxide, and nitrogen oxide ($NO_x$) such as, for example nitrogen dioxide $NO_2$. $NO_x$ emissions are known to occur from combustion at relatively high temperatures, for example over 3,000° F. (1648° C.). These temperatures occur when fuel is burned at fuel-/air ratios at or near stoichiometric, or, alternatively, at or near an equivalence ratio of 1.0, which represents actual fuel/air ratio divided by the stoichiometric fuel-/air ratio. The amount of emissions formed is directly related to the time, i.e., residence time, that combustion takes place at these conditions.

Conventional gas turbine engine combustors for use in an engine for powering an aircraft, naval vessel, or power plant are conventionally sized and configured for obtaining varying fuel/air ratios during the varying power output requirements of the engine such as, for example, lightoff, idle, takeoff, and cruise modes of operation of the engine in the aircraft. At relatively low power modes, such as lightoff and idle, a relatively rich fuel/air ratio is desired for initiating combustion and maintaining stability of the combustion. At relatively high power modes, such as for example cruise operation of the engine in the aircraft, a relatively lean fuel/air ratio is desired for obtaining reduced exhaust emissions.

Although stoichiometric fuel/air mixtures are preferred for obtaining substantially complete combustion, it is known that $NO_x$ emissions are maximized at the stoichiometric condition and are reduced for both rich and lean operation since $NO_x$ formation increases with increased flame temperature, as well as with increased residence time. In order to reduce $NO_x$ emissions, rich-lean staged combustors are known which may either be radially or axially staged. In the axial rich-lean staged combustor, a rich stage is provided for first burning rich fuel/air mixtures, with incomplete combustion thereof, which is then rapidly quenched with dilution air to a lean equivalence ratio. Combustion is then completed in the lean stage at relatively low temperature for reducing the $NO_x$ emissions.

However, since the quenching occurs in a relatively short axial length, it is difficult to adequately mix the rich, partially burned mixture with the dilution air without providing pockets of stoichiometric mixtures therein which will generate $NO_x$ emissions. Mixing is also required to obtain a good pattern factor, i.e., uniform temperature profile at the combustor outlet. A typical axially staged rich-lean combustor has an hour glass shape with a reduced area to accelerate the flow for reducing residence time as well as introducing dilution air for quenching. Other configurations of axially and radially staged rich-lean combustors vary in complexity. And, conventional combustors typically used in an aircraft gas turbine engine are more simply configured with radially spaced apart, annular, outer and inner combustion liners defining an annular (annulus) combustion chamber therebetween, but are not effective for rich-lean staged operation.

OBJECTS OF THE INVENTION

Accordingly, one object of the present invention is to provide a new and improved axially staged, rich-lean combustor and method of operation.

Another object of the present invention is to provide a rich-lean stage combustor having improved mixing of dilution air with rich combustion gases with decreased residence time thereof.

Another object of the present invention is to provide a combustor having improved dilution air penetration for increasing mixing with the rich combustion gases.

Another object of the present invention is to provide means for quenching rich combustion gases which may be retrofitted into a conventional annular combustor.

SUMMARY OF THE INVENTION

An annular combustor includes a plurality of circumferentially spaced, radially extending dilution poles disposed in an intermediate zone thereof between a forward combustion zone and an aft combustion zone. Adjacent ones of the dilution poles define therebetween a throat for receiving the combustion gases from the forward zone. The dilution poles include circumferentially facing dilution holes for injecting dilution air into the throats for mixing with the combustion gases being channeled therethrough. The dilution poles are effective for blocking the combustion gases at a plurality of circumferentially spaced apart locations and accelerating the combustion gases through the throats for reducing residence time in the throat. The dilution air is injected through the dilution holes for improved penetration into the combustion gases in the throats for mixing therewith to form lean combustion gases which undergo final combustion in the aft zone.

BRIEF DESCRIPTION OF THE DRAWING

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
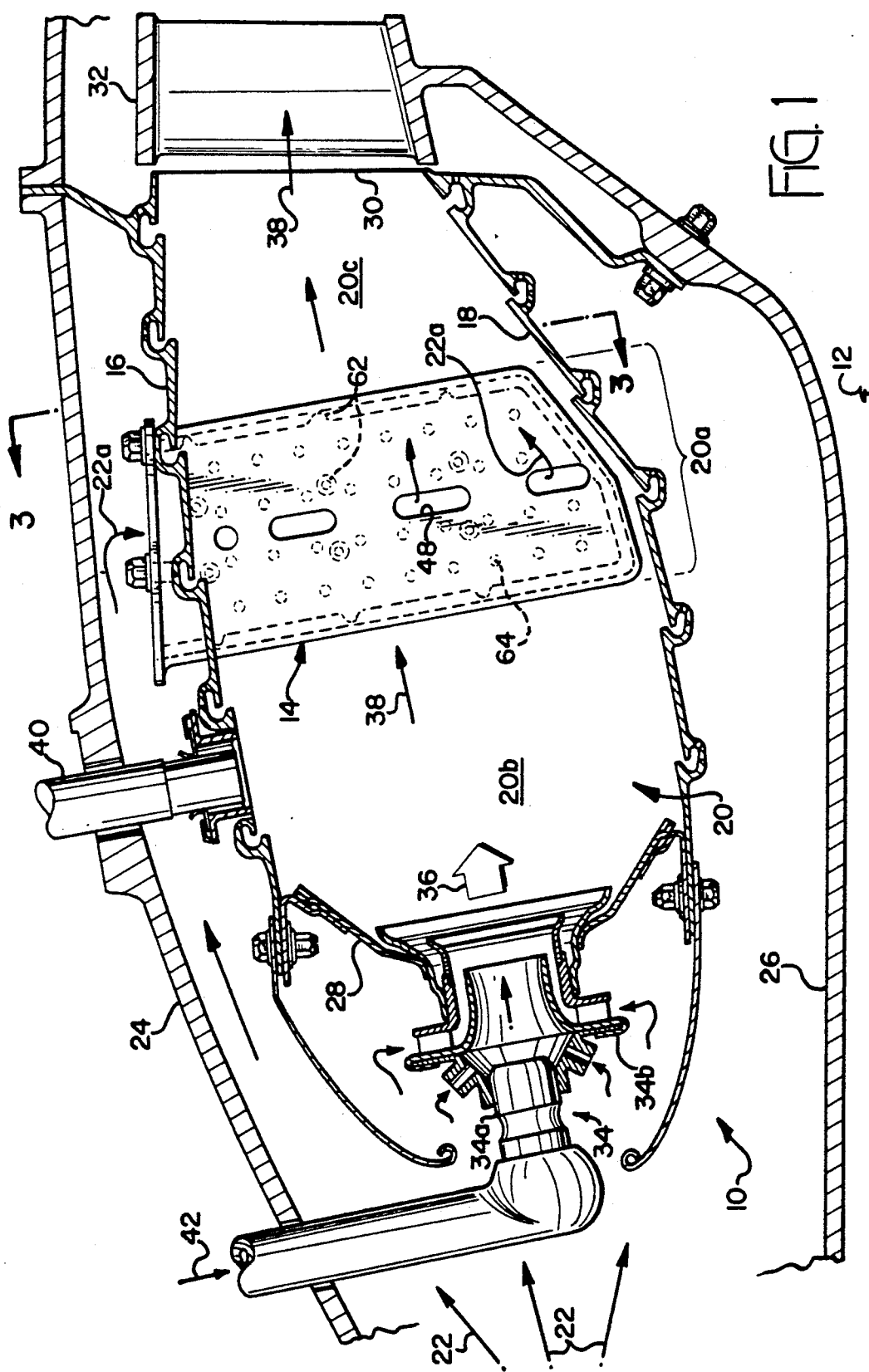
FIG. 1 is an axial, partly sectional view of one half of a combustor including dilution poles in accordance with one embodiment of the present invention extending radially inwardly from an outer liner thereof and taken generally along line 1—1 in FIG. 3.
Figure 2:
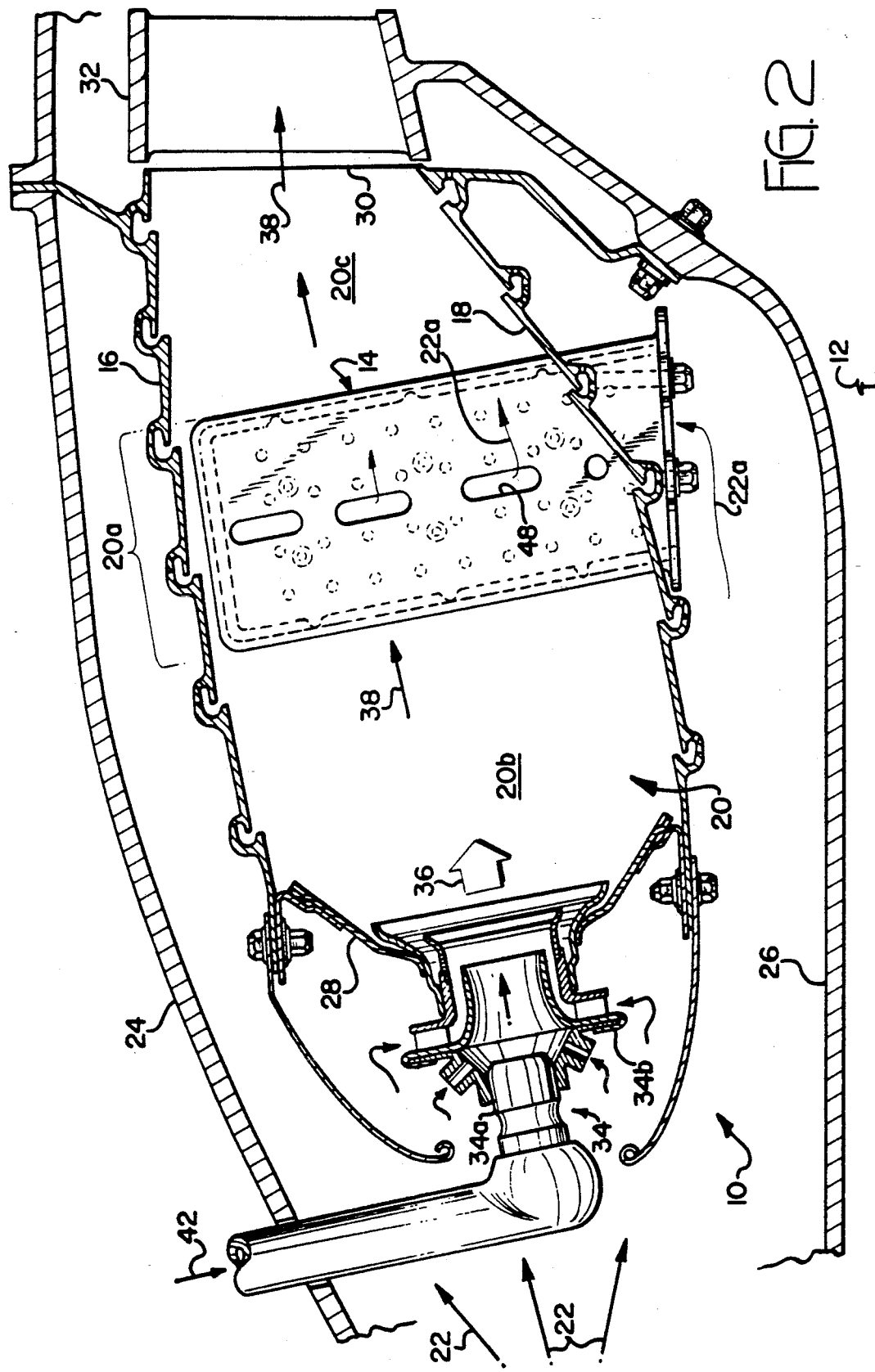
FIG. 2 is an axial, partly sectional view of the combustor illustrated in FIG. 1 showing another dilution pole extending radially outwardly from an inner liner thereof and taken generally along line 2—2 in FIG. 3 in mirror image.

Illustrated schematically in FIGS. 1 and 2 are the upper halves of a gas turbine engine combustor 10 having a longitudinal, axial centerline axis 12. Except for a plurality of circumferentially spaced apart dilution poles 14, the combustor 10 is otherwise conventional.

More specifically, the combustor 10 includes conventional radially outer and inner film-cooled annular liners 16, 18 disposed coaxialy about the centerline axis 12 and spaced radially apart from each other to define an annular combustion chamber 20 therebetween in the form of an annulus. The combustor 10 is disposed downstream of a conventional compressor (not shown) for receiving therefrom compressed air 22. The outer liner 16 is spaced radially inwardly from an outer casing 24 to provide therebetween an annulus for channeling a portion of the compressed air 22. The inner liner 18 is spaced radially outwardly from an inner casing 26 to define therebetween another annulus for channeling therethrough another portion of the compressed air 22. At upstream ends of the outer and inner liners 16, 18, a conventional annular, aft facing dome 28 is fixedly joined thereto, and the downstream ends of the liners 16 and 18 define therebetween an annular combustor outlet 30. Disposed immediately downstream from the combustor outlet 30 is a conventional annular turbine nozzle 32 having a plurality of circumferentially spaced apart nozzle vanes in flow communication with the combustor outlet 30.

A plurality of conventional, circumferentially spaced apart carburetors 34 are conventionally disposed in the dome 28 for providing a fuel/air mixture 36 axially through the dome 28 and into the combustion chamber 20 to generate combustion gases 38 which are flowable through axially the combustion chamber 20 from the dome 28 to the outlet 30 and discharged therefrom. As shown in FIG. 1, a conventional igniter 40 extends radially inwardly through the outer casing 24 and through the outer liner 16 for conventionally igniting the fuel/air mixture 36 to generate the combustion gases 38 therefrom.

Each of the carburetors 34 includes a conventional fuel injector 34a for conventionally injecting fuel 42 into the combustor 10 through a conventional air swirler 34b wherein a portion of the compressed air 22 is conventional swirled and mixed with the fuel 42 therein for forming the fuel/air mixture 36 discharged therefrom.

Figure 3:
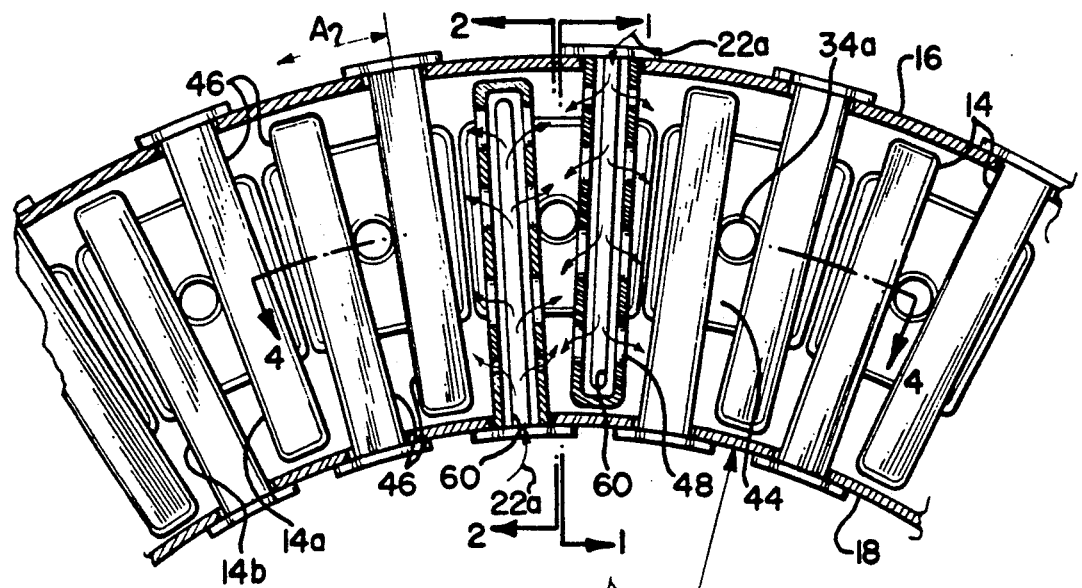
FIG. 3 is an upstream facing, partly sectional view of a portion of the combustor illustrated in FIG. 1 taken generally along line 3—3.
Figure 4:
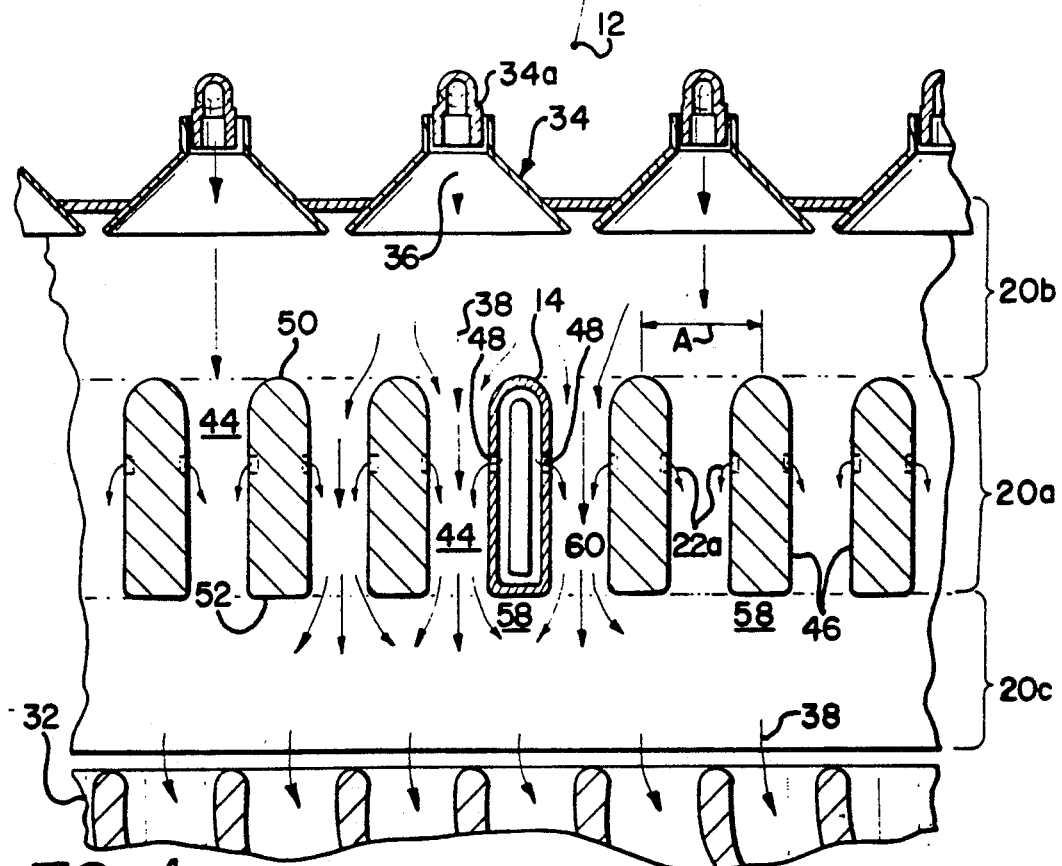
FIG. 4 is a partly sectional, radially inwardly looking view of a portion of the combustor illustrated in FIG. 3 taken along arcuate line 4—4.

As described above, the combustor 10 is conventional but for the dilution poles 14. The dilution poles 14 preferably extend radially between the outer and inner liners 16, 18 at an axial position relative to the longitudinal centerline axis 12 which is spaced between the dome 28 and the outlet 30 axially downstream from the former and axially upstream from the latter to define an annular, intermediate, or quenching zone 20a disposed axially between a forward combustion zone 20b extending upstream therefrom to the dome 28 and an aft combustion zone 20c extending downstream therefrom to the outlet 30. But for the dilution poles 14, the combustion chamber 20 is a fully open annulus without obstruction for channeling the combustion gases 38 from the dome 28 to the outlet 30. As shown in FIGS. 3 and 4, the dilution poles 14 extend radially between the outer and inner liners 16 and 18 and are circumferentially spaced apart from each other to define circumferentially between adjacent ones thereof radially extending throats 44 for axially accelerating the combustion gases 38 from the forward zone 20b and into the intermediate zone 20a, as shown more clearly in FIG. 4.

The dilution poles 14 are provided to practice a new method of blocking flow of the combustion gases 38 at a plurality of circumferentially spaced apart locations, i.e., the poles 14, at an axial position spaced between the dome 28 and the outlet 30 to define the intermediate, forward, and aft zones 20a, 20b, and 20c. The flow of the combustion gases 38 is also blocked radially between the outer and inner liners 16, 18 at each of the dilution poles 14 so that the collective blockage effect of the dilution poles 14 reduces the available flow area for the combustion gases 38 which are confined to flow through the reduced area throats 44 to, thereby, accelerate the combustion gases 38 between the poles 14 to increase the velocity thereof. The combustion gases 38 flow without obstruction in the forward zone 20b and in the aft zone 20c, but with obstruction as described above through the intermediate zone 20a for accelerating the combustion gases 38 therethrough.

Once the combustion gases 38 are accelerated to a higher velocity than the velocity thereof in the forward zone 20b, the method further includes a step of injecting dilution air designated 22a, since it is a portion of the compressed air 22, preferably circumferentially into the combustion gases 38 being channeled through the throats 44 and radially between the outer and inner liners 16, 18 for rapidly diluting, or quenching, the combustion gases 38, and efficiently mixing therewith to reduce the equivalence ratio of the combustion gases 38 channeled to the aft zone 20c.

More specifically, and referring to FIGS. 3 and 4, each of the dilution poles 14 includes circumferentially opposite sides 46 and at least one dilution hole 48 disposed therein, and preferably facing in the circumferential, or tangential direction for injecting the dilution air 22a channeled thereto circumferentially into the combustion gases 38 being channeled axially through the throats 44 and radially between the outer and inner liners 16, 18.

Referring to both FIGS. 2 and 4, it should be appreciated that the dilution poles 14 in combination with the basic conventional combustor 10 allow for axial, rich-lean staging operation thereof. More specifically, the forward combustion zone 20b may alternatively be referred to as a rich zone 20b, with the carburetor 34 being conventionally sized and configured for receiving required amounts of the compressed air 22 from the compressor, and required amounts of the fuel 42 from a conventional fuel control (not shown) for forming and injecting the fuel/air mixture 36 with a rich equivalence ratio greater than 1.0, and for example at about 1.5. The combustion gases 38 generated from the fuel/air mixture 36 are channeled through the forward zone 20b with a rich equivalence ratio which will, therefore, have reduced $NO_x$ emissions due to both the lower combustion temperature thereof and the lack of oxygen available in the fuel-rich mixture. In the intermediate zone 20a, which is alternatively referred to as the quenching zone, the dilution air 22a is injected into the accelerated combustion gases 38 being channeled through the throats 44 for mixing the dilution air 22a with the combustion gases 38 therein to provide quenched combustion gases 38 to the aft zone 20c with a lean equivalence ratio less than 1.0, and for example of about 0.5. The dilution air 22a therefore reduces the equivalence ratio of the combustion gases 38 channeled through the aft zone 20c to the desired lean values. In this way, the lean equivalence ratio of the combustion gases 38 flowing through the aft zone 20c are also effective for reducing $NO_x$ emissions therefrom.

The dilution poles 14 are preferably configured for collectively blocking about half of the flow area which would otherwise occur in the intermediate zone 20a with the remaining unobstructed flow area collectively provided by the throats 44 being about half of the total flow area between the outer and inner liners 16 and 18 at the dilution poles 14. In this way, the combustion gases 38 channeled from the forward zone 20b are accelerated in velocity in the intermediate zone 20a to about twice the velocity of the combustion gases 38 in the forward zone 20b, for example, from about 125 fps (38 m/s) to about 250 fps (76 m/s). The increased velocity reduces the residence time thereof in the quenching zone 22a and improves the mixing thereof with the dilution air 22a therein all for reducing $NO_x$ emissions and providing a good pattern factor.

Referring again to FIGS. 3 and 4, the dilution poles 14 in the preferred embodiment are disposed in pairs, with a first one thereof designated 14a extending radially inwardly from the outer liner 16 to terminate at the inner liner 18, and the second one thereof designated 14b extending radially outwardly from the inner liner 18 to terminate at the outer liner 16. It is desirable that the dilution poles 14 extend substantially entirely radially between the outer and inner liners 16, 18, and several embodiments thereof are contemplated. The dilution poles 14a, 14b may be fixedly joined to the respective outer and inner liners 16 and 18 at one end thereof as shown, or could be joined at both ends thereof to both liners 16 and 18 if desired. In the embodiment illustrated, the dilution air 22a may be effectively channeled from above the outer liners 16 radially inwardly into the first dilution pole 14a, and another portion of the dilution air 22a may be channeled from radially inwardly of the inner liner 18 and radially outwardly into the second dilution pole 14b. In the preferred embodiment, about half of the dilution air 22a is channeled radially inwardly through the first poles 14a and the remaining half of the dilution air 22a is channeled radially outwardly into the second poles 14b.

Figure 5:
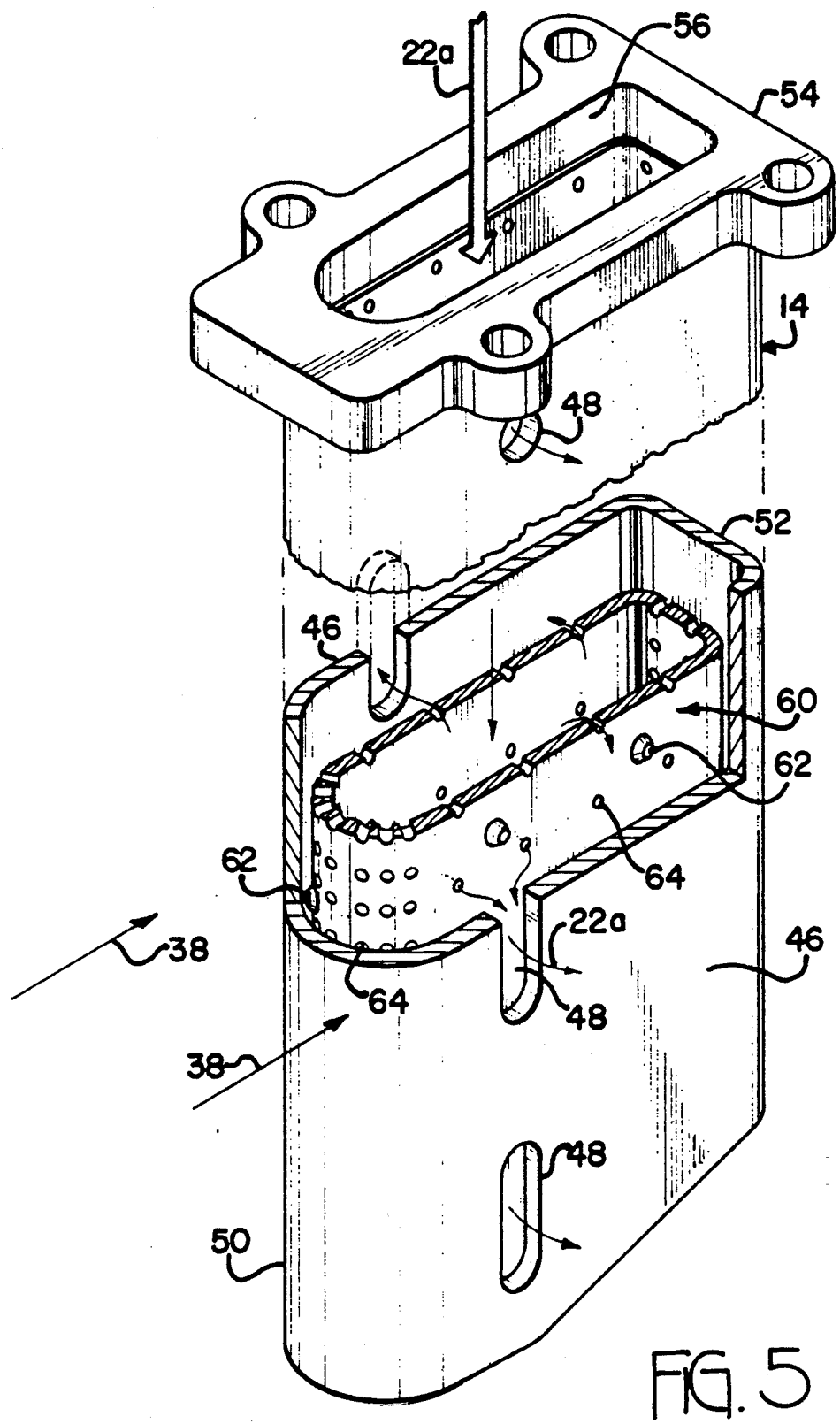
FIG. 5 is a schematic, perspective view, partly in section and cutaway, of the dilution pole illustrated in FIG. 1.

An exemplary one of the dilution poles 14 is illustrated in more particularity in FIG. 5, which shows the radially inwardly extending first dilution pole 14a of FIG. 1, with the radially outwardly extending second dilution pole 14b of FIG. 2 being substantially identical thereto except being inserted radially upwardly through the inner liner 18 to terminate at the outer liner 16. Since the dilution poles 14 are directly immersed in the combustion gases 38 at conventionally high combustion gas temperatures, the dilution pole is preferably formed from a conventional non-metallic material, such as a ceramic monolithic or composite material capable of withstanding the elevated temperatures therein. Exemplary ceramic materials which may be used include silicone nitride ($Si_3N_4$), or a silicon carbide fiber ScS-6, which is a material available from Textron Specialty Materials, or a silicon carbide particulate and alumina (aluminum oxide) such as that available under the SiCp-/$Al_2O_3$ trademark of DuPont/Lanxide.

As shown in FIG. 5, the dilution pole 14 is radially elongate and includes radially extending leading and trailing edges 50 and 52, respectively, joining together the pole opposite sides 46. The dilution pole 14 has a proximal end 54 in the form of a platform flange which includes an inlet aperture 56 for first receiving the dilution air 22a, which aperture 56 is disposed in flow communication with the dilution holes 48 as described in more detail below. In an exemplary embodiment, each of the dilution poles 14a, 14b may be conventionally bolted to their respective outer and inner liners 16, 18 at their root platforms. Conventional bolts may be welded to the respective liners 16, 18, and the root platforms 54 include complementary holes through which the bolts may pass and then suitable tubular sleeves and/or nuts are then used to fixedly secure the root platforms 54 to the respective liners 16, 18 as shown in FIGS. 1 and 2.

Referring to both FIGS. 4 and 5, the dilution pole opposite sides 46 are preferably substantially planar, or flat, between the leading and trailing edges 50, 52, and the dilution holes 48 are disposed in the pole opposite sides 46 in an intermediate position between the leading and trailing edges 50, 52 for injecting the dilution air 22a circumferentially or tangentially toward adjacent and opposite ones of the dilution poles 14. In the preferred embodiment, the leading edge 50 is aerodynamically streamlined, for example being generally semicircular, to provide a smooth transition of the combustion gases 38, and the acceleration thereof into the throats 44. The throat area between adjacent dilution poles 14 remains substantially constant in the axial flow direction along the planar opposite sides 46 to the trailing edges 52 in the preferred embodiment. Once the combustion gases 38 are initially accelerated into the throats 44, they are then mixed with the dilution air 22a being injected therein from the dilution holes 48. The trailing edges 52 are preferably planar, or flat, and face in the downstream direction to provide a wake, or flame stabilization, zone 58 immediately downstream of each of the dilution poles 14 for providing a conventional flame holding capability in the event it is required.

As illustrated in FIG. 4, the dilution poles 14 are preferably equiangularly spaced apart from each other at an included angle A through the radial centers thereof as measured in the circumferential direction about the centerline axis 12. Also in the preferred embodiment, each fuel injector 34a is preferably axially aligned equidistantly between, and upstream of, adjacent ones of the dilution poles 14 so that if any hot streak occurs from the fuel/air mixture 36 being injected axially downstream from the fuel injector 34a, it will be directed axially downstream between adjacent dilution poles 14. And, in the preferred embodiment, two dilution poles 14 are provided for each of the fuel injectors 34a. In alternate embodiments of the invention, fewer dilution poles 14 than twice the number of fuel injectors 34a may be used and may be circumferentially positioned relative to the fuel injectors 34a as desired for particular applications.

Referring to both FIGS. 3 and 5, each of the dilution poles 14 preferably includes a plurality of the dilution holes 48 spaced radially apart in each of the dilution pole opposite sides 46. For example, each side 46 of each of the dilution poles 14 in the preferred embodiment illustrated includes three radially elongate, or race-track shaped dilution holes 48 radially spaced from each other and a fourth, circular, dilution hole 48 near the respective roots 54 thereof. As shown in FIG. 4, the dilution holes 48 are all aligned with each other in a common axial plane and directly face each other in a circumferential direction for injecting the dilution air 22a initially substantially perpendicularly towards the opposing dilution pole 14. In this way, the required distance of penetration of the dilution air 22a into the throat 44 is substantially reduced over that required in a conventional combustor wherein dilution air is injected solely in the radial direction through the outer and inner liners. By injecting the dilution air 22a into the throat 44 from two opposite directions from the adjacent dilution poles 14, not only is the required penetration of each jet thereof relatively small, the penetration and mixing capability of the dilution air jets is improved without requiring relatively large pressure driving forces thereof.

As shown in FIG. 3, the dilution holes 48 of adjacent ones of the dilution poles 14 are radially aligned at least in part with each other, i.e., radial overlapping, for collectively injecting the dilution air 22a into the throats 44 without radial interruption therebetween. Note in FIG. 3 that at any radius R from the centerline 12 from the lowermost, circular, dilution hole 48 of the second dilution pole 14b to the uppermost, circular, dilution hole 48 of the first dilution pole 14a, dilution air 22 is being injected into each throat 44 at all radial positions therebetween either by the first dilution pole 14a or the second dilution pole 14b. In this way, fewer dilution holes 48 are required for radially spreading the dilution air 22a between the outer and inner liners 16, 18 for more efficiently utilizing the dilution air 22a.

Furthermore, the temperature profile and pattern factor of the combustion gases 38 entering the turbine nozzle 32 from the combustor outlet 30 may be more precisely controlled by selective radial, circumferential and axial placement of the dilution air 22a from the poles 14. This is an improvement over conventional dilution holes in the liners 16, 18 which require substantial radial penetration of the dilution air into the combustion gases. The axial and circumferential location of the poles 14, and the radial location of the dilution holes 48 provide three variables which may be adjusted to control the temperature profile and pattern factor.

As illustrated in FIG. 5, each of the dilution poles 14 preferably includes a hollow impingement baffle 60 which is complementary in shape to the inner chamber of the dilution pole 14 and is maintained at a predetermined spacing therefrom by a plurality of conventional stand-offs, or bumps 62 for forming a manifold between the baffle 60 and the inside surface of the dilution pole 14. The baffle 60 includes a plurality of radially and axially spaced apart impingement holes 64 over its entire surface for injecting the dilution air 22a from the inside of the baffle 60 against the inner surface of the dilution pole 14 for impingement cooling thereof in a conventionally known manner. The proximal end of the baffle 60 is disposed in flow communication with the inlet aperture 56 for first receiving the dilution air 22a portion of the compressed air 22 and channeling it radially inwardly through the hollow impingement baffle 60. The air 22a is then channeled from inside the baffle 60, through the impingement holes 64 and against the inside surface of the dilution pole 14 for impingement cooling thereof. The dilution holes 48 are disposed in flow communication with the manifold between the impingement baffle 60 and the inside surface of the dilution pole 14, and in flow communication with the impingement holes 64 for receiving the dilution air 22a first used for impingement cooling of the inside surface of the dilution pole 14 which is then injected through the dilution holes 48 into the throats 44. In this way, the dilution air 22a is first used for cooling the dilution pole 14 and is then used for dilution of the combustion gases 38 flowing through the throats 44. The baffle 60 may be formed from conventional high temperature capability metals typically used to form combustor liners such as those sold under the trademarks Inconel 625, or Hastelloy X, or HS 188, or it may be formed from conventional ceramic monolithic or composite materials if desired.

Accordingly, the combustor 10 as described above in preferred embodiments, utilizes the dilution poles 14 to define the intermediate quenching zone 20a between the forward, rich zone 20a and the aft, lean zone 20c. The dilution poles 14 are effective for accelerating the combustion gases 38 from the rich zone 20b into the quenching zone 20a wherein the combustion gases 38 are effectively mixed with the dilution air 22a at a relatively high velocity therein, which reduces residence time in the quenching zone 20a, to form the lean combustion gases 38 channeled through the lean zone 20c. $NO_X$ emissions are, therefore, effectively reduced by burning the fuel/air mixture 36 with a rich equivalence ratio in the rich zone 20b, and with a lean equivalence ratio in the lean zone 20c, and with improved mixing of the rich combustion gases 38 with the dilution air 22a in the quenching zone 20a for reducing the likelihood of any stoichiometric pockets thereof which would generate $NO_X$ emissions.

Furthermore, the dilution poles 14 may be used in a conventional annular combustor, such as combustor 10, without substantial modifications to obtain an axially staged rich-quench-lean combustor which is simpler in configuration than those disclosed in the prior art, and with the possibility of retrofitting existing combustor designs.

While there have described herein what are considered to be preferred embodiments of the present invention, other modifications of the invention shall be apparent to those skilled in the art from the teachings herein, and it is, therefore, desired to be secured in the appended claims all such modifications as fall the true spirit and scope of the invention.

Accordingly, what is desired to be secured by Letters Patent of the United States is the invention as defined and differentiated in the following claims:

We claim:

1. In a gas turbine engine annular combustor having a longitudinal centerline axis, outer and inner annular liners spaced radially apart coaxially about said centerline axis to define an annular combustion chamber therebetween, an annular dome at upstream ends of said liners having a plurality of circumferentially spaced apart carburetors for providing a fuel/air mixture into said combustion chamber to generate combustion gases therein, and an annular outlet defined at downstream ends of said liners for discharging said combustion gases, a method comprising:

channeling said fuel/air mixture axially through said dome into said combustion chamber to generate said combustion gases;

blocking flow of said combustion gases at a plurality of circumferentially spaced apart locations at an axial position spaced axially downstream from said dome and spaced axially upstream from said outlet to define an intermediate zone disposed axially between a forward zone extending upstream therefrom to said dome, and an aft zone extending downstream therefrom to said outlet, and radially between said outer and inner liners to accelerate said combustion gases between said blocking locations in a plurality of circumferentially spaced apart throats;

injecting dilution air into said combustion gases being channeled through said throats and radially between said outer and inner liners channeling said combustion gased through said forward zone with a rich equivalence ratio; and wherein said injecting step mixes said dilution air with said combustion gases being channeled through said throats to quench said combustion gases channeled to said aft zone to a lean equivalence ratio.

2. A method according to claim 1 wherein said blocking step provides a plurality of circumferentially spaced apart flame stabilization zones in said aft zone.

3. A method according to claim 2 wherein said combustion gases are accelerated in velocity in said intermediate zone to about twice the velocity of said combustion gases in said forward zone.

4. A gas turbine engine annular combustor having a longitudinal centerline axis comprising:

outer and inner annular liners disposed coaxially about said centerline axis and spaced radially apart to define an annular combustion chamber therebetween;

an annular, axially aft facing dome fixedly joined to upstream ends of said outer and inner liners, and downstream ends of said outer and inner liners defining therebetween an annular outlet;

a plurality of circumferentially spaced apart carburetors disposed in said dome for providing a fuel/air mixture axially through said dome into said combustion chamber to generate combustion gases flowable axially therethrough from said dome to said outlet and dischargeable through said outlet;

a plurality of circumferentially spaced apart dilution poles extending radially between said outer and inner liners at an axial position spaced axially downstream from said dome and spaced axially upstream from said outlet to define an intermediate zone disposed axially between a forward combustion zone extending upstream therefrom to said dome, and an aft combustion zone extending downstream therefrom to said outlet, said poles also defining circumferentially between adjacent ones thereof radially extending throats for axially accelerating said combustion gases from said forward zone and into said intermediate zone;

each of said poles including circumferentially opposite sides and at least one dilution hole in each of said sides for injecting dilution air circumferentially into said combustion gases being channeled through said throats and radially between said outer and inner liners and said carburetors being sized for providing said fuel/air mixture into said forward combustion zone with a rich equivalence ratio, and said dilution hole being effective to inject said dilution air to quench said combustion gases to a lean equivalence ratio.

5. A combustor according to claim 4 wherein each of said dilution poles includes:

radially extending leading and trailing edges joining together said pole opposite sides, and an inlet aperture at a proximal end thereof for first receiving said dilution air, and being disposed in flow communication with said dilution holes; and said pole opposite sides being substantially planar between said leading and trailing edges, and said dilution holes being disposed in said pole opposite sides between said leading and trailing edges for injecting said dilution air circumferentially toward adjacent ones of said dilution poles.

6. A combustor according to claim 5 further including:

a plurality of said dilution holes spaced radially apart in each of said dilution pole opposite sides; and said dilution holes of adjacent ones of said poles being radially aligned at least in part with each other for collectively injecting said dilution air into said throats without radial interruption therebetween.

7. A combustor according to claim 6 wherein said dilution poles are equiangularly spaced apart from each other.

8. A combustor according to claim 7 wherein each of said carburetors includes a fuel injector axially aligned between adjacent ones of said dilution poles and spaced upstream therefrom.

9. A combustor according to claim 6 wherein each of said dilution poles includes a hollow impingement baffle therein spaced from an inside surface of said dilution pole and disposed in flow communication with said pole inlet aperture, said baffle including a plurality of impingement holes for injecting said dilution air received from said inlet aperture in impingement against said pole inside surface, said dilution holes being disposed in flow communication with said impingement holes for discharging into said throats said dilution air first used for impingement cooling of said dilution pole.

10. A combustor according to claim 6 wherein said dilution poles are disposed in pairs, with a first one thereof extending radially inwardly from said outer liner to terminate at said inner liner with said proximal end thereof being joined to said outer liner, and a second one thereof extending radially outwardly from said inner liner to terminate at said outer liner with said proximal end thereof being joined to said inner liner.

* * * * *